Patented May 5, 1925.

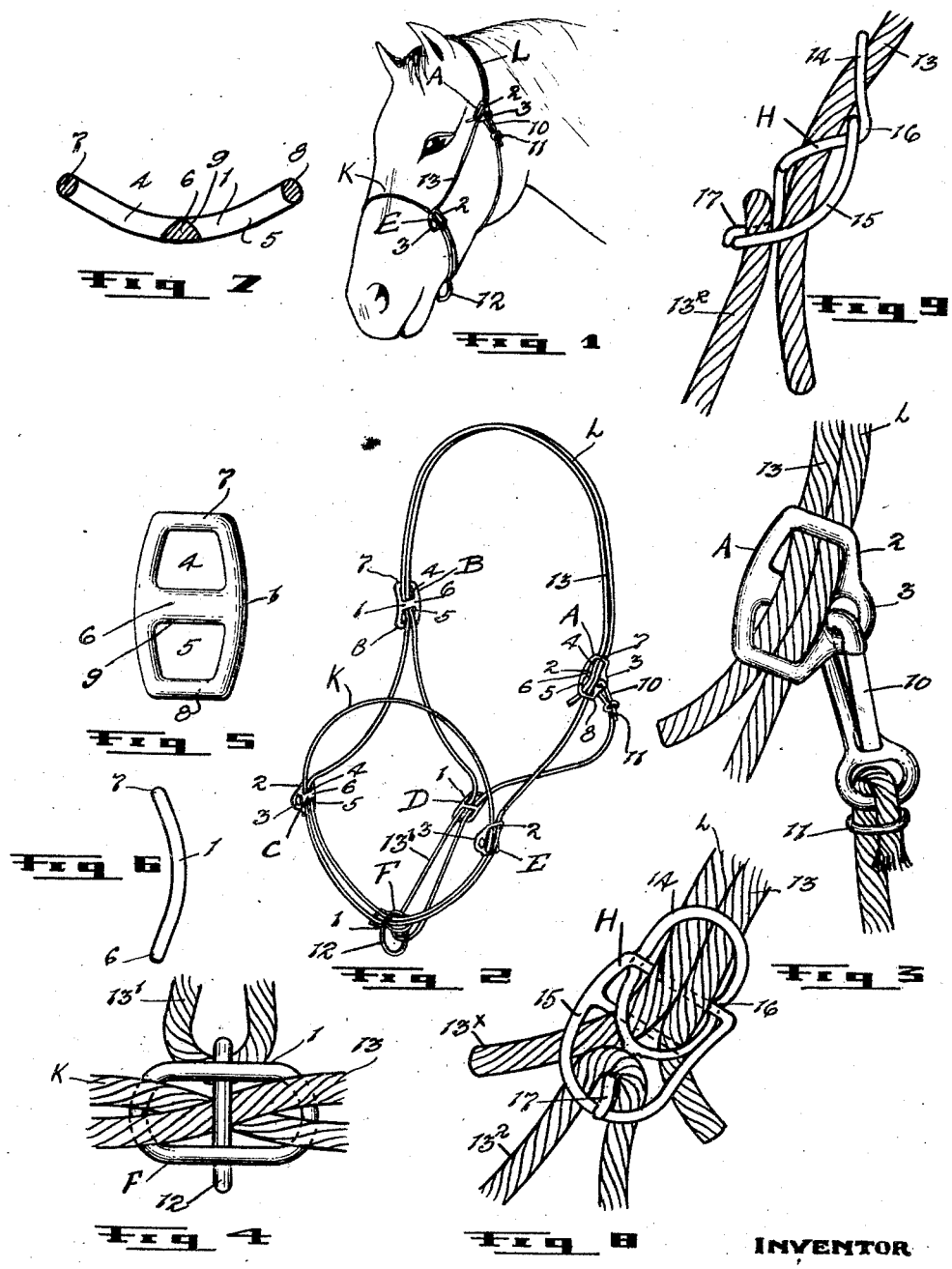

1,536,507

UNITED STATES PATENT OFFICE.

JOHN LAWSON, OF MEETING CREEK, ALBERTA, CANADA.

HALTER.

Application filed March 1, 1924. Serial No. 696,251.

*To all whom it may concern:*

Be it known that I, JOHN LAWSON, of the village of Meeting Creek, in the Province of Alberta, Canada, have invented certain new and useful Improvements in Halters, of which the following is the specification.

The invention relates to improvements in halters and particularly rope halters and an object of the invention is to provide a halter constructed from a length of rope and special fittings, the fittings being arranged such that anyone can readily and quickly thread the rope through the fittings provided and form the halter.

A further object is to provide a halter which can be quickly adjusted to accommodate the head of the animal and which is unbreakable and which is arranged also so that a bit can be attached thereto if desired.

A further object is to provide a halter having no clamps with rigid fastenings, and which is arranged so that the rope can be readily renewed when desired and which has the fittings designed so that they are practically indestructible.

With the above more important objects in view the invention consists essentially in the arrangement and construction of parts hereinafter more particularly described, reference being had to the accompanying drawings in which:

Fig. 1 is a perspective view of the halter applied on the animal's head.

Fig. 2 is an enlarged perspective view of the halter.

Fig. 3 is a perspective view of the snap hook and fitting used therewith.

Fig. 4 is a plan view of the tie ring and fitting associated therewith.

Fig. 5 is a face view of one of the fittings.

Fig. 6 is a side view of the fitting shown in Fig. 5.

Fig. 7 is an enlarged, detailed, longitudinal sectional view through the fitting shown in Fig. 5.

Fig. 8 is a perspective view of a modified type of fitting utilized in place of the snap hook fitting.

Fig. 9 is a side view of the parts appearing in Fig. 8.

In the drawing like characters of reference indicate corresponding parts in the several figures.

As a breeder of stock I have found it very desirable to have a halter which can be quickly made and adjusted to the head of the animal, and with this in view I have designed a number of special fittings by using which one can quickly make a halter provided a length of suitable rope is at hand.

In the attached drawing I have shown two arrangements of halters and I will first describe the halter shown in Figures 1 to 7 inclusive.

A plurality of similar fittings for forming purposes are used, there being three fittings 1 of the type best shown in Figures 5, 6 and 7 and three fittings 2 as best shown in Fig. 3 which are the same as those 1 with the exception that they have an additional side eye 3 integrally formed as part thereof.

The fittings 1 and 2 are of metal and present openings 4 and 5 separated by a cross rib 6, the rib being in a lower plane than the elevated ends 7 and 8 of the fitting. The rib has the upper side thereof of a V or wedge shape as indicated at 9 and the outer ends of the openings 4 and 5 are somewhat smaller than the inner ends adjoining the rib. The fittings 2 are constructed exactly the same as those 1 with the exception as above pointed out that they have the side eye 3 formed at one side of the fitting adjoining the rib.

When one provided with these six fittings, a snap hook 10, a clamping ring 11 and a tie ring 12 desires to make a halter he procures a length of rope 13 and then proceeds to pass the rope through the fittings in the manner now described, the various fittings for the purpose of identification in the present disclosure being specifically indicated at A, B, C, D, E, and F. One end of the rope is threaded through the openings 4 and 5 of the fitting A and over the rib 6. The other end of the rope is then passed in succession through the openings 4 and 5 of the fitting B, the fitting C, the fitting F, the fitting E, the fitting C, the fitting F, the fitting E, the fitting A, the fitting B, the fitting D, the ring 12, the fitting D and then finally terminates in the snap hook 10, where it is fastened by the clamping ring 11. The rope is threaded twice through all fittings and as it is being threaded through the fitting F the ring 12 is caught on the rope and the rope is crossed at this point (see Fig. 4). The throat loop formed in the rope at 13′, after it has passed through and reentered the fitting D, is caught on the ring 12.

One can readily slide the rope in the fittings to accommodate the head of the animal to which the halter is to be applied, and after the halter has been so fitted the end of the rope is cut to a proper length and the snap hook is attached to the end thereof. The part of the rope between the snap hook and the fitting D forms a throat strap which permits of the halter being readily removed from the animal's head by undoing the snap hook from the eye of the fitting A.

I might here point out that the contracted ends of the openings 4 and 5 are designed to crowd the strands of rope tightly together at the ends of the fitting, and that the V-shaped cross rib 6 of each fitting is adapted to bite into the passing rope strands with the result that when the two strands of rope passing through the fittings are pulled tight they will not end shift.

The fittings are practically unbreakable and can be used again with another rope if the first rope wears out.

In Figures 8 and 9 I have shown a modified type of fitting which can be substituted for the snap hook and the fitting associated therewith.

The fitting in the latter figures is represented generally by the reference character H and it comprises two parts 14 and 15, the part 15 being of the same general form but slightly larger than the fitting 1, and the part 14 being in the form of an oval shaped ring centrally dished as indicated at 16 and provided at one end with an extending U-shaped catch 17. The said fitting H is assembled by catching one end of the part 15 in the bend 16 of the ring 14 and the catch 17 is adapted to hook on to the opposite end of the member 14. This latter arrangement is best shown in Fig. 9.

The modified form of halter is made from a single piece of rope and the fittings as shown in Fig. 2 are used with the exception of the fitting A. The fitting H is substituted for the fitting A.

The modified halter is formed by passing and anchoring one end 13$^x$ of the rope in the fitting H in the manner best shown in Fig. 8, then threading the rope successively through the fitting B, the fitting C, the fitting F, the fitting E, the fitting C, the fitting F, the fitting E, looping it as indicated at 13$^2$ over the catch 17, then passing it through the fitting D, looping it through the ring 12 and back through the fittings D and B and finally passing the end through the fitting H it being understood that the two ends of the rope terminate at the fitting H as shown in Fig. 8. The loop 13$^2$ forms a throat strap and one can undo the throat strap by end shifting the loop 13$^2$ upwardly in the member 15, then raising the tongue and releasing the loop to pull through and clear of the member 15. In all instances two strands of rope pass through each fitting and it is looped once to catch on the ring and once to catch on the catch 17.

In either type of halter the fittings C and E appear at the sides of the nose loop K, and the ring 12 appears at the under side of the nose loop. Fitting D appears under the throat and the fittings B and A or B and H, as the case may be, appear at opposite sides of the head and on the head loop L. The fittings C and E are provided with the eyes 3 so that one can readily attach a bit (not shown) to the halter by tying the same to the said eyes or utilizing any of the well known types of snap hooks available.

What I claim as my invention is:

1. A halter comprising a plurality of similar fittings having a pair of openings separated by a cross web, a tie ring, and a single length of rope passed twice through all of the fittings and once through the tie ring to form a nose loop, a head loop and a throat loop.

2. A halter comprising a plurality of similar fittings, a tie ring, a single length of rope passed twice through each fitting and once through the tie ring to form a nose loop, a head loop and a throat loop and having one end thereof terminating the throat loop.

3. A halter comprising a plurality of similar fittings each having two openings separated by a cross web, a tie ring, and a single length of rope passed twice through the openings of each fitting and over the web thereof and once through the tie ring to form a nose loop, a head loop and a throat loop, said throat loop passing through the tie ring.

4. A halter comprising a plurality of similar fittings each having openings separated by a cross web, a tie ring, a single length of rope passed twice through all of said fittings and once through the tie ring to form a nose loop, a head loop and a throat loop and having one end thereof terminating the throat loop, and a snap hook attached to the end of the rope terminating the throat loop.

Signed at Meeting Creek this 9th day of August, 1923.

JOHN LAWSON

In the presence of—
MARGARET LAWSON,
JEAN MENZIES.